Patented Mar. 20, 1928.

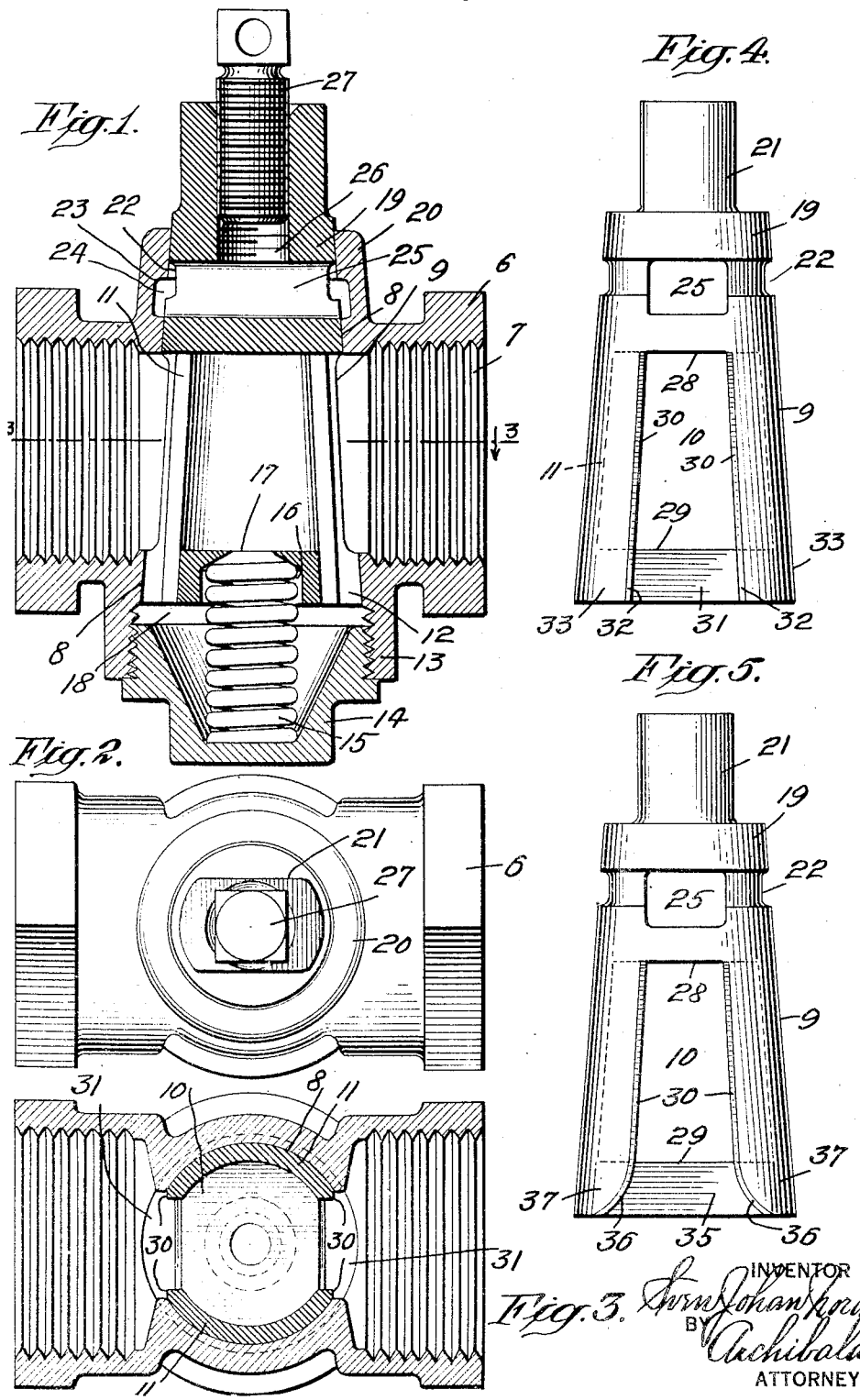

1,662,892

UNITED STATES PATENT OFFICE.

SVEN JOHAN NORDSTROM, OF SAN FRANCISCO, CALIFORNIA, ASSIGNOR TO MERCO NORDSTROM VALVE COMPANY, OF SAN FRANCISCO, CALIFORNIA, A CORPORATION OF DELAWARE.

VALVE.

Application filed April 29, 1926. Serial No. 105,363.

The invention relates to an improvement in valves, and more particularly to an improvement in plug valves of the type in which lubricant under pressure is utilized to separate the plug from its seat for the purpose of lubricating and sealing the bearing or seating surfaces of the plug and the valve seat in the casing.

The object of the invention is to adapt the pressure lubrication principle of lifting the plug from its seat for lubrication and sealing purposes to valves of the simplest and cheapest construction, such as are used for gas and similar service. To the accomplishment of this object the invention consists in the improved plug valve hereinafter described and particularly pointed out in the appended claims.

In the accompanying drawings illustrating the preferred form of the invention, Fig. 1 is a longitudinal section through the improved valve, with the plug shown in open position; Fig. 2 is a top plan of the parts shown in Fig. 1; Fig. 3 is a section taken along the line 3—3 of Fig. 1; Fig. 4 is a side elevation of the preferred form of plug for the valve; and Fig. 5 is a modified form of plug embodying the principles of the invention.

The improved valve as illustrated in the drawings comprises a casing 6 having a longitudinal passageway 7 therethrough and a tapered hole 8 formed transversely of the passageway adapted to serve as a valve seat for the tapered plug 9 which is provided with a hole 10 adapted to register with the passageway 7 when the valve is open, as shown in Figs. 1 and 3. For cheapness of construction the walls 11 of the middle part of the plug 9 are formed concentric and are relatively thin, as is more clearly indicated in Fig. 3.

The large end 12 of the plug terminates within the open, annular flange-like part 13 of the casing. A hollow cap 14 is threaded into the flange 13 and closes the opening therethrough. A coiled expansion spring 15 one end of which seats against the inner surface of the head of the cap 14 and the other end of which is seated in a hole 16 bored axially in the larger end of the plug serves to resiliently hold the plug 9 against the valve seat 8. An opening 17 in the bottom of the hole 16 permits the fluid passing through the line to enter the space 18 between the larger end of the plug and the cap 14 to assist in holding the plug against its seat.

The smaller end 19 of the plug projects through the annular part 20 formed on one side of the valve casing 6. This part of the plug serves as the valve stem and its outer end is flattened at 21 to receive a wrench by which the plug is manipulated in opening and closing the valve.

In order that the plug may be lifted from its seat for the purpose of lubricating and sealing the contact joint between the plug and the valve seat the smaller end of the plug is provided with a circumferential groove 22 which cooperates with a circumferential recess 23 formed in the part 20 of the casing to constitute a lubricant chamber 24. A transverse hole 25 cored in the smaller end of the plug connects the lubricant chamber 24 with the inner end of a lubricant reservoir 26 formed in the valve stem 19. A screw 27 threaded into the outer end of the flattened part 21 of the valve stem serves to put the lubricant in the reservoir 26 under pressure to force it into the chamber 24 and by the vertical component exerted on the exposed parts of the small end of the plug to lift the plug from its seat against the action of the spring 15. Inasmuch as the type under consideration is used for light pressure service it has been found by experience that the vertical component of the lubricant under pressure in the chamber 24 on the parts of the plug projecting into the chamber is sufficient to lift the plug from its seat.

Difficulty has heretofore been experienced in causing the lubricant to travel along and cover the whole length of the bearing surfaces between the plug and the valve seat. It has been found that the lubricant will readily reach the point 28 which marks the termination of the hole 10 at the smaller end of the plug, and will with difficulty reach the point 29 which marks the termination of the hole 10 at the larger end of the plug. The lubricant finally reaches the point 29 and then stops without covering the remainder of the plug and the adjacent part of the valve seat. In order to cause the lubricant to travel or work along the bearing surfaces of the plug from the point 28 to the point 29 more expeditiously, and to travel or work along the remainder of the bearing surface of the plug and so cover the whole of the plug, the present invention provides two means: One for causing a more rapid travel of the lubricant from the point 28 to the point 29, and the other for causing the lubricant to travel from the point 29 to the extremity of the large end of the plug. To cause the lubricant to work along the part of the plug surfaces between the points 28 and 29, I chamfer the edges of the hole 10, as at 30, so as to create an angular space between the edges of the hole 10 and the adjacent parts of the valve seat 8 when the valve is turned. The lubricant works along this angular space and is forced by the chamfered surfaces 30, acting as wedges, into the contact joint between the plug and the valve seat.

To cause the lubricant to work over and cover the surface of the plug from the point 29 to the extremity of the large end of the plug, I cut away or relieve the bearing surface of this end of the plug at the points 31 so that they constitute in appearance but not in reality an extension of the hole 10. These cut away spaces 31 on opposite sides of the larger end of the plug permit the lubricant to pass into them and be forced by the outer ends 32 of the chamfered edges 30 into the contact joint between the bearing parts 33 of the large end of the plug and the adjacent part of the valve seat. For some conditions of service it is desirable to use a plug with its larger end modified as shown in Fig. 5, in which the cut away part of the plug is represented at 35 and the outer ends of the chamfers 30 are shown flared outwardly at 36. For some kinds of lubricant adapted for a particular service in which the valve is used it is desirable to employ the flaring outer ends 36 of the chamfered edges 30 to cause the lubricant to be forced outwardly along the side edges of the cut away portions 35 and so more expeditiously cover the bearing parts 37 of the larger end of the plug and the adjacent parts of the valve seat.

Having thus described the invention what I claim as new is:—

1. A valve comprising, a casing having a passageway therethrough and a tapered valve seat formed transversely of the passageway, a tapered plug seated in the valve seat and having a hole adapted to register with the passageway, a valve stem connected with the smaller end of the plug, means associated with the larger end of the plug for holding it resiliently against its seat, a circumferential groove at the smaller end of the plug, an annular recess in the adjacent part of the casing cooperating with the circumferential groove to form a lubricant chamber, a lubricant reservoir in the valve stem and having a communication with the lubricant chamber, means for putting the lubricant in the reservoir under pressure to force it into the chamber, the edges of the hole through the plug being chamfered to exert a wedging action on the lubricant to force it between the plug and the adjacent part of the valve seat and so cause it to travel longitudinally along and circumferentially about the surfaces of the plug.

2. A valve comprising, a casing having a passageway therethrough and a tapered valve seat formed transversely of the passageway, a tapered plug seated in the valve seat and having a hole adapted to register with the passageway, an annular lubricant chamber between the smaller end of the plug and the adjacent part of the casing, a lubricant reservoir in the plug connected with the annular lubricant chamber, and means for putting the lubricant in the reservoir under pressure to force it into the annular chamber, the larger end of the plug being cut away at opposite sides beyond the hole and in alinement with the ends of the hole to permit lubricant to enter the space thereby created and be forced between the remaining bearing surfaces of the larger end of the plug and the adjacent part of the casing.

3. A valve comprising, a casing having a passageway therethrough and a tapered valve seat formed transversely of the passageway, a tapered plug seated in the valve seat and having a hole adapted to register with the passageway, a lubricant containing recess between the smaller end of the plug and the adjacent part of the casing, and means for introducing lubricant under pressure into the recess to unseat the plug, the edges of the hole in the plug being chamfered to exert a wedging action on the lubricant as the plug is turned, and the larger end of the plug beyond the extremity of the hole through the plug being cut away to permit the lubricant to pass into the space thereby provided.

SVEN JOHAN NORDSTROM.